United States Patent
Silny et al.

(10) Patent No.: US 8,294,879 B2
(45) Date of Patent: Oct. 23, 2012

(54) MULTI-DIRECTIONAL ACTIVE SENSOR (75) Inventors: John F. Silny, Los Angeles, CA (US); Gary D. Coleman, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/966,466

(22) Filed: Dec. 13, 2010

(65) Prior Publication Data

US 2012/0120382 A1    May 17, 2012

Related U.S. Application Data

(63) Continuation of application No. 12/946,629, filed on Nov. 15, 2010, now abandoned.

(51) Int. Cl.
*G01C 3/08* (2006.01)
(52) U.S. Cl. ....... 356/4.01; 356/3.01; 356/4.1; 356/5.01
(58) Field of Classification Search ......... 356/3.01–28.5
See application file for complete search history.

(56) References Cited

U.S. PATENT DOCUMENTS

| 6,163,372 | A | 12/2000 | Sallee et al. |
| 6,491,420 | B1* | 12/2002 | Scifres .......................... 362/553 |
| 2007/0034732 | A1 | 2/2007 | Sallee |
| 2007/0181810 | A1 | 8/2007 | Tan et al. |
| 2008/0109126 | A1* | 5/2008 | Sandin et al. ................... 701/23 |
| 2009/0142066 | A1* | 6/2009 | Leclair et al. ................. 398/139 |

FOREIGN PATENT DOCUMENTS

| DE | 10162009 A1 | 7/2003 |
| EP | 2453253 A1 | 10/2011 |

* cited by examiner

*Primary Examiner* — Luke Ratcliffe
(74) *Attorney, Agent, or Firm* — Pierce Atwood LLP; Joseph M. Maraia (57) ABSTRACT

A multi-directional sensor system includes a light source configured to generate a beam of electromagnetic radiation; and a transmitter configured to transmit the beam of electromagnetic radiation to a target. The transmitter may include (i) a plurality of optical fibers, wherein one or more of the optical fibers are configured to receive the beam of electromagnetic radiation, and (ii) a surface on which one end of each of the plurality of optical fibers terminate in a different direction and/or orientation thereof to emit electromagnetic radiation. A detector is configured to detect electromagnetic radiation responsive to electromagnetic radiation transmitted to the target. A method of sensing is also disclosed.

30 Claims, 7 Drawing Sheets

|  | MULTI-DIRECTIONAL RECEIVER OPTION A- FIBER RECEIVER (FIG. 4A) | UNI-DIRECTIONAL RECEIVER OPTION B- NON-FIBER RECEIVER(S) (FIG. 4B) |
|---|---|---|
| SWITCHED TRANSMITTER OPTION A- FIBER SUBSET ILLUMINATED (FIG. 3A) | NO RANGE OR DIRECTION AMBIGUITY-EMPLOY SIMPLE MATCHED FILTER (MF) TO EACH DETECTOR RESPONSE | POSSIBLE RANGE/DIRECTION AMBIGUITY-MULTIPLE METHODS POSSIBLE TO RESOLVE AMBIGUITY |
| NON-SWITCHED TRANSMITTER OPTION B- ALL FIBERS ILLUMINATED (FIG. 3B) | NO RANGE OR DIRECTION AMBIGUITY-EMPLOY SIMPLE MATCHED FILTER (MF) TO EACH DETECTOR RESPONSE | POSSIBLE RANGE/DIRECTION AMBIGUITY-NOT RESOLVABLE IF PRESENT |

MULTI-DIRECTIONAL ACTIVE SENSOR

CROSS-REFERENCE TO RELATED APPLICATIONS

This application is a continuation which claims benefit under 35 USC §120 to co-pending U.S. application Ser. No. 12/946,629 filed Nov. 15, 2010, the entire contents of which are incorporated herein by reference.

BACKGROUND

This application generally relates to optical sensors, and more particularly, to a multi-directional optical sensor.

Previous attempts to provide multiple direction proximity detection and sensing have included: (1) single isotropic radio frequency (RF) transmitter and receiver, (2) single/multiple articulated RF transmitter(s) and receiver(s), (3) multiple passive electro-optical (EO) sensors on different platforms for triangulation and range estimation, and (4) single/multiple articulated active EO sensors (e.g. LADAR).

However, these approaches have not been found to provide adequate directional response, and/or are very complex.

SUMMARY

In an embodiment, a multi-directional sensor system comprises: a light source configured to generate a beam of electromagnetic radiation; a transmitter configured to transmit the beam of electromagnetic radiation to a target, said transmitter comprising: (i) a plurality of optical fibers, wherein one or more of the optical fibers are configured to receive the beam of electromagnetic radiation, and (ii) a surface on which one end of each of the plurality of optical fibers terminate in a different direction and/or orientation thereof to emit electromagnetic radiation; and a detector configured to detect electromagnetic radiation responsive to electromagnetic radiation transmitted to the target.

In another embodiment, a method for sensing electromagnetic radiation comprises: generating a beam of electromagnetic energy with a light source; transmitting the beam of electromagnetic energy to a target by: (i) receiving, via one or more optical fibers, the beam of electromagnetic radiation from the light source; and (ii) transmitting electromagnetic energy from a surface which one end of each of the plurality of optical fibers terminate in a different direction and/or orientation thereof to emit electromagnetic radiation; and detecting electromagnetic radiation responsive to electromagnetic radiation transmitted to the target.

In some implementations, the transmitter may further include a receiver configured to receive electromagnetic radiation responsive to electromagnetic radiation transmitted to the target and direct the received electromagnetic radiation to the detector. The receiver may include one or more optical fibers with the optical fibers that transmit light to the target being different than optical fibers that receive light from the target These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the inventive concept. In addition, it should be appreciated that structural features shown or described in any one embodiment herein can be used in other embodiments as well.

DETAILED DESCRIPTION

According to one or more embodiments, a sensing system is configured to provide an enlarged area for transmission (and in some instances, also for reception) of electromagnetic energy (light) in multiple directions and/or orientations. The sensing system may also be referred to herein as a "multi-directional" or "omni-directional" sensing system.

A bundle of optical fibers can map a light source, such as a laser, to a transmitter cap to provide transmission to a large angular volume. In some implementations, a switching element may selectively enable one or more transmitter optical fibers to achieve a desired angular coverage, resolution and/or complexity. This may provide sequential and/or simultaneous angular coverage. In some instances, the transmission as well as the reception solid angle may be up to $4\pi$ sr (corresponding to an area of $4\pi r^2$ for a spherically shaped transmitter cap).

Figure 1:
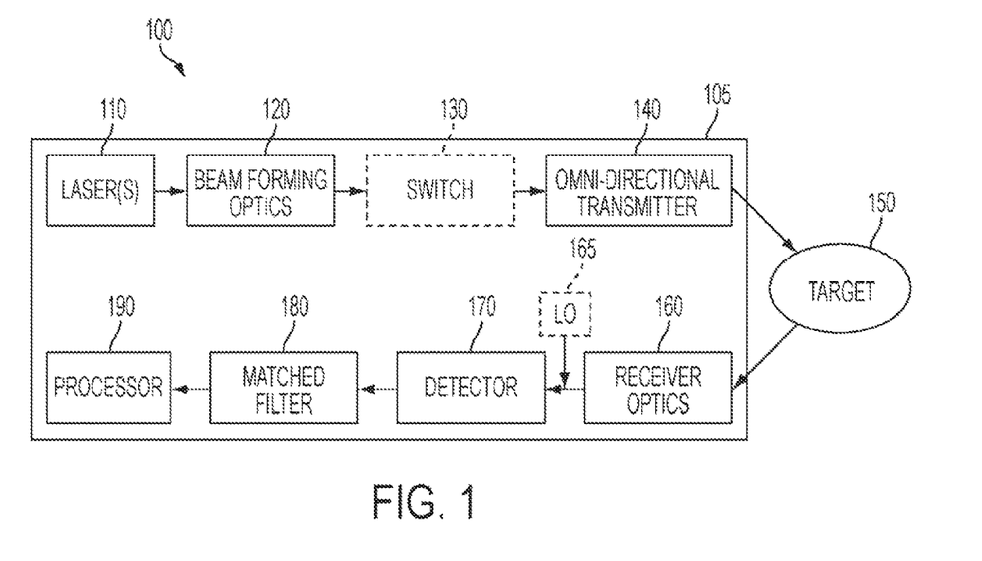
FIG. 1 illustrates an exemplary schematic for a multi-directional sensing system in accordance with an embodiment.

FIG. 1 illustrates exemplary schematic for multiple direction sensing system 100 in accordance with an embodiment. The elements depicted in dashed line (and in some cases others) may be optional in some implementations.

System 100 may include one or more light sources illuminating one or more optical fibers, either directly or via an optional optical switch. The optical fibers may be multi-mode fiber optical fibers, for example. System 100 may be configured as a proximity sensor to detect distance in one embodiment.

In one implementation, the transmitter may include a spherical or hemi-spherical (or similar conic or other shaped) cap in which the fibers terminate. The fibers may be configured, in some implementations, to act as laser radar (ladar) transmitters illuminating, either sequentially or simultaneously, a large angular volume of space.

Multi-directional sensing system 100 generally includes one or more lasers 110, beam forming optics 120, switch 130, multiple direction transmitter 140 configured to transmit electromagnetic radiation (light) to target 150, receiver optics 160, local oscillator (LO) 165, detector 170, matched filter 180 and processor 190. In some embodiments, system 100 may be integrated sensor element.

Housing 105 may incorporate the various elements of system 100 and protects the elements from excessive/ambient light, the environment (e.g., moisture, dust, etc.), mechanical damage (e.g., vibration, shock, etc). In addition, housing 105 may be generally impervious to electromagnetic radiation (other than through one or more predefined apertures).

One or more lasers 110 may include any active laser to generate a continuous or pulsed beam of light. These may include, for instance, a gas, chemical, solid state, fiber, or semiconductor type laser, such as a 632 nm HeNe or a 1064 nm Nd:YAG laser.

Of course, other light sources, such as, for example, lamps, light emitting diodes (LED), collimated light sources, etc., might be used also. The emitted beam may include electrometric radiation (light) in the infrared (IR), visible (VIS), and/or ultraviolet (UV) spectra. As further discussed herein, in some implementations, laser 110 may utilize pulse compression or encoding.

Beam forming optics 120 may include one or more lens for collimating light, beam directing mirrors, filters, or other optics for shaping the beam.

In some embodiments, an optional switch 130 may be provided which is configured to select and direct the beam from laser 110 to one or more of the optical fibers of transmitter 140. The selected optical fibers may be referred to as channels of system 100. As such, one or more optical fibers of a fiber optic bundle of transmitter 140 can be mapped to a laser to provide a large angular transmission volume for either sequential or simultaneous coverage and/or resolution.

Switch 130 may include an optical switching element, such as, for example, an optical phased array (OPA); a microelectro-mechanical system (MEMS); or a tunable liquid crystal (LC) filter. Exemplary OPAs that may be used may include those described in U.S. Pat. Nos. 5,126,869; 5,093,747 and 4,964,701, herein incorporated by reference in their entireties. And, in some implementation, switch 130 may include an electronically actuated micro-mirror without the need for large-scale mechanically actuated components. Switching and non-switching techniques are further described below with respect to FIGS. 3A and 3B.

Transmitter 140 is configured to transmit electromagnetic radiation from the system. Generally, transmitter 140 may include (i) a plurality of optical fibers, wherein one or more of the optical fibers are configured to receive radiation from the beam of electromagnetic energy, and (ii) a cap having an enlarged surface area in which one end of each of the plurality of optical fibers terminate in a different direction and/or orientation thereof to emit electromagnetic radiation.

Figure 2A:
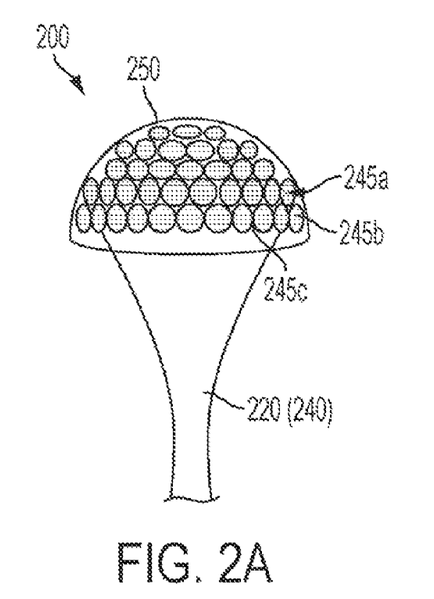
FIGS. 2A and 2B illustrate one exemplary multi-directional transmitter for use in multiple directional sensing system in accordance with an embodiment.

In some instances, transmitter 140 may have a spherical or other conically shaped cap. As shown in FIG. 2A, transmitter 140 may have a substantially hemispherically shaped cap. The transmitter cap provides a large annular volume for light transmission (and in some cases reception) in multiple directions and/or orientations.

As will be appreciated, a spherically shaped cap can provide a solid angle spread of transmitted electromagnetic radiation (light) up to $4\pi$ sr (corresponding to an area of $4\pi r^2$) while a hemispherically shaped cap can provide a solid angle spread of transmitted electromagnetic radiation (light) up to $2\pi$ sr (corresponding to an area of $2\pi r^2$). Other shapes will provide different angular spread relative to their own particular geometry.

Additional transmitter optics (not shown) may also be provided in some embodiments. For instance, each optical fiber may include a lens, optics filter, or other element at a surface of the cap for shaping its transmitted beam.

The transmitted electromagnetic radiation is directed in one or more predetermined directions or orientations toward target 150 based on the shape and/or size of the transmitter cap and the optical fibers.

Target 150 may include, for example, an object (e.g., a person, animal, plant, vehicle, building, natural formation, etc) and/or a scene (e.g., ground, space, sky, etc.). In some instances, target 150 may be microscopic or not ordinarily observable with the naked eye, such as micro- or nano-structures. Alternatively or additionally, target 150 may be macroscopic or very large in which only a (small) portion thereof is observable at any one instance, such as the sky or a large vista. One or both of beam forming optics 120 and receiver optics 160 may be selectively configured for transmitting and/or receiving electromagnetic radiation (light) to and from a particular target 150, as desired.

Receiver optics 160 are configured to receive electromagnetic radiation responsive to electromagnetic radiation (light) that was transmitted from the transmitter 140 to target 150. The received electromagnetic radiation (light) may include, for instance, one or more of: reflected radiation (e.g., specular and/or diffuse reflection), refraction, diffraction, interference, secondary radiation (e.g., Compton scattering, Bremsstrahlung, x-ray fluorescence, etc.), or the like, depending of a particular application and/or target 150. Exemplary receivers optics 160 are further described below with respect to FIGS. 4A and 4B.

LO 165 may be optional to support coherent detection. LO 165 is configured to covert the received light to a different intermediate frequency for processing. One example of an LO that may be used is a continuous wave version of the transmitted beam that is coherently mixed (heterodyned) with the received radiation to form an intermediate frequency (IF), for example, within the kilohertz or megahertz frequency range. The frequency content of the IF signal may be extracted to determine the Doppler shift and associated radial velocity of the target relative to the observer. Additionally, use of an LO may have other system benefits such as increasing signal-to-noise.

Detector 170 may be configured to provide detections with temporal (range) and directional (angular) information. In some implementations, detector 170 may include any two-dimensional (2-D) sensor configured to detect electromagnetic radiation (light) corresponding to the entering light of interest and generate image frames, whether still or video image. Exemplary electromagnetic radiation detectors may include complementary metal-oxide-semiconductor (CMOS), charge-coupled device (CCD), or other detectors having sufficient spectral response to detect light of interest, for example, in the infrared (IR), visible (VIS), and/or ultraviolet (UV) spectra and generate electrical signals in response thereto. The detector signals may correspond to one or more of: intensity, wavelength (color), frequency, etc., as a function of time, and/or positional data (e.g., polar or Cartesian coordinate location data).

In one implementation, detector 170 may be a focal plane array (FPA) sensor. Other image sensors may also be used which can provide video and/or still images.

Output from detector 170 may be displayed on any display device (not shown). Exemplary displays may include a cathode ray tube (CRT), plasma display, liquid crystal display (LCD), light emitting diode (LED) display, pen chart, etc. In some instances, output of detector 170 may, alternatively or additionally, be printed by a printing device and/or stored in an electronic memory (not shown). Additional image processing may be further performed on the output signal (or image), if so desired, such as, for example, noise filtering, cropping, resizing, color-coordination, annotation, etc.

Filter 180 may be selectively configured as a matched filter to match the transmitted pulse and optimally threshold and yield detections. This may help to remove noise and other extraneous detection thus, improving the received signal-to-noise ratio (SNR).

Processor 190 is configured to receive output from detector 170 and perform image processing, as discussed herein. Processor 190 may include hardware, such as Application Specific Integrated Circuits (ASICs), Field Programmable Gate Arrays (FPGAs), digital signal processors (DSPs), or other integrated formats. However, those skilled in the art will recognize that processor 190 may, in whole or in part, be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as firmware, or as any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium used to carry out the distribution.

In one embodiment, a "real-time" processor may be configured to use temporal and directional correlation to reduce inaccurate detection (e.g., "false alarms" or "false positives").

Figure 2B:
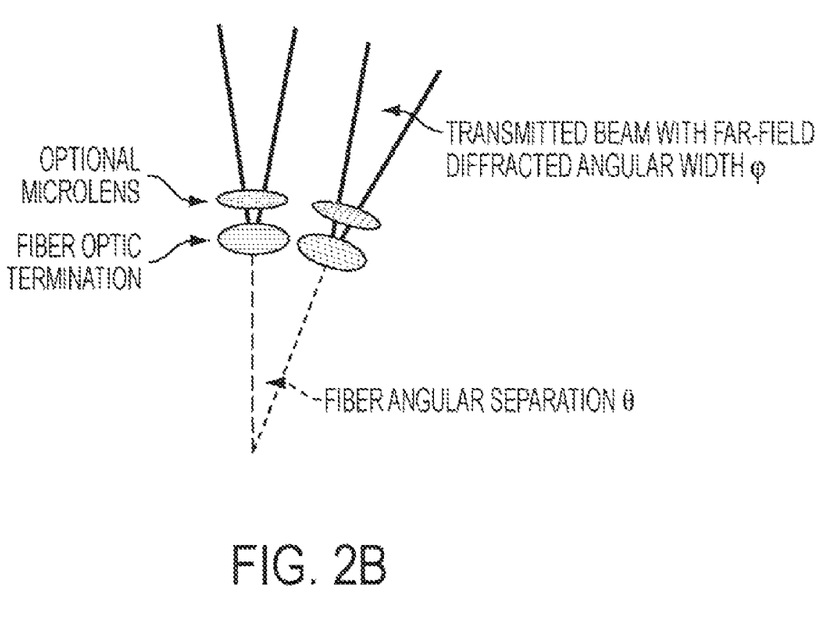

FIGS. 2A and 2B illustrate one exemplary multi-directional transmitter 200 for use in multiple direction sensing system 100 in accordance with an embodiment.

FIG. 2A shows multi-directional transmitter 200A in accordance with an embodiment. Multi-directional transmitter 200A includes sheath 220 enclosing fiber optic bundle 240 and cap 250. Fiber optic bundle 240 includes a plurality of optical fibers 245. As shown, cap 250 may have a hemispherical shape. Of course, it will be appreciated that cap 250 may have other three-dimensional shapes, such as, for an example, a cube, prism, sphere, ellipsoid, etc, as desired. Each of the plurality of transmitter optical fibers 245 terminate at cap 250. Transmitter fibers 245a, 245b, 245c, etc. direct light from laser to cap 250 and outwardly emit light away from cap 250.

FIG. 2B illustrates the angular separation θ of two fibers (of many) terminating at the cap of the transmitter, in accordance with an embodiment. The transmitted beams have an far-field diffracted angular width φ from each fiber optic which is determined by the wavelength of light, the transmitter area, the fiber numerical aperture, and the effects of any powered optical element (e.g. an optional small (micro) lens) at the end of the fiber that shapes the beam direction and extent.

In various embodiments, there may be a "trade-off" in terms of the size and/or shape of cap 250 and the number and/or the size of fibers 245 as well as their angular coverage relative to cap 250. These and other parameters may be selected to "tune" or optimize the transmitter. For example, the number of fibers, fiber diameter, beam wavelength, beam quality, fiber angular separation, shape of the transmitter cap, and size of the transmitter cap, among others, may be each adjusted to provide a desired angular resolution, far-field overlap, energy per direction, re-visit rate, and a high probability of detection.

Table 1 shows one configuration for multi-directional transmitter 200 for used in multi-directional sensing system 100 that can used for sensing one particular target. This particular target was a 30 cm diameter diffuse spherical target having a 20% reflectance surface located approximately 1 km from sensing system. The results showed that sufficient received flux (i.e., photons) for this configuration.

TABLE 1

| Exemplary Configuration Parameters and Results. | |
|---|---|
| Transmitter Wavelength, μm | 1.5 |
| Transmitter Diameter, μm | 43 |
| Transmitter Energy, mJ | 10 |
| Transmitter FOR, sr | 2.1 |
| Number of Fibers | 1024 |
| Fiber Angular Spacing, deg. | 2.6 |
| Pulse Repletion Frequency, kHz | 2 |
| Revisit Rate, Hz | 2 |
| Avg. Power, W | 20 |
| Range, km | 1 |
| Target Type | diffuse sphere |
| Target Diameter, m | 0.3 |
| Target Albedo | 0.2 |
| Receiver Diameter, cm | 7.5 |
| Received Photons, ph | 288 |

Figure 3A:
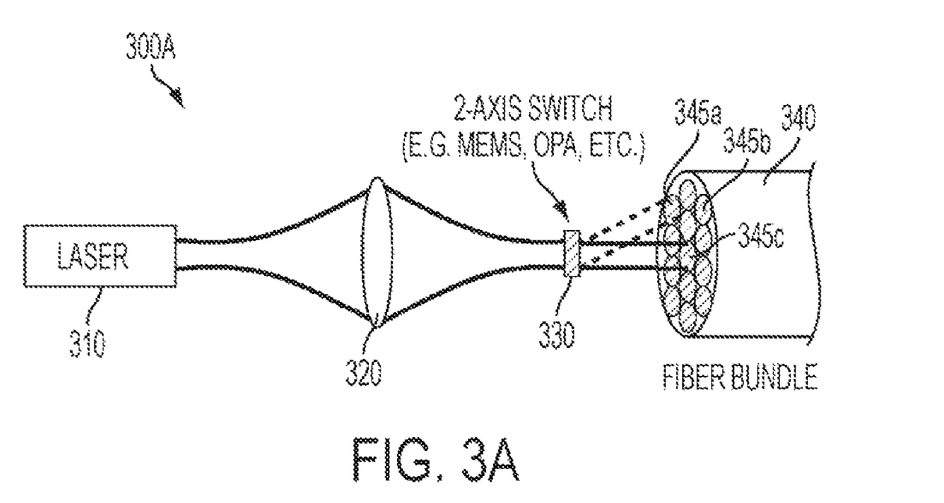
FIGS. 3A and 3B illustrate exemplary laser-to-transmitter coupling techniques for a multi-directional transmitter for use in multi-directional sensing system in accordance with one or more embodiment.
Figure 3B:
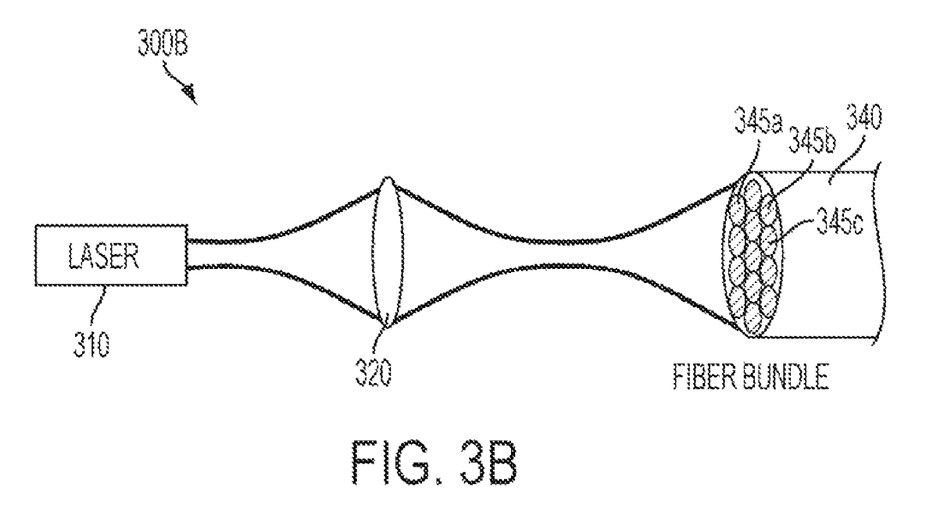

FIGS. 3A and 3B illustrate exemplary switching techniques for transmitter 300 for use in multi-directional sensing system 100 in accordance with embodiments.

FIG. 3A shows switched transmitter 300A in accordance with an embodiment. Laser 310 transmits light beam to optical fiber bundle 340. Lens 320 collimates light beam. Switch 330 is configured to selectively direct light beam to one of more individually fibers 345 of the optical fiber bundle. For instance, in a first instance, switch 330 directs a first light beam to fiber 345a. In a second instance, switch directs a second light beam to fiber 345c. Processor 190, for instance, can provide sequenced switching for various optical fibers 345.

FIG. 3B shows non-switched transmitter 300B in accordance with an embodiment. Laser 310 transmits light beam to optical fiber bundle 340. Lens 320 collimates the entire light beam toward all fibers 345 of fiber bundle 340. Thus, a portion of light beam is received by each fiber 345a, 345b, 345c, etc.

Figure 4A:
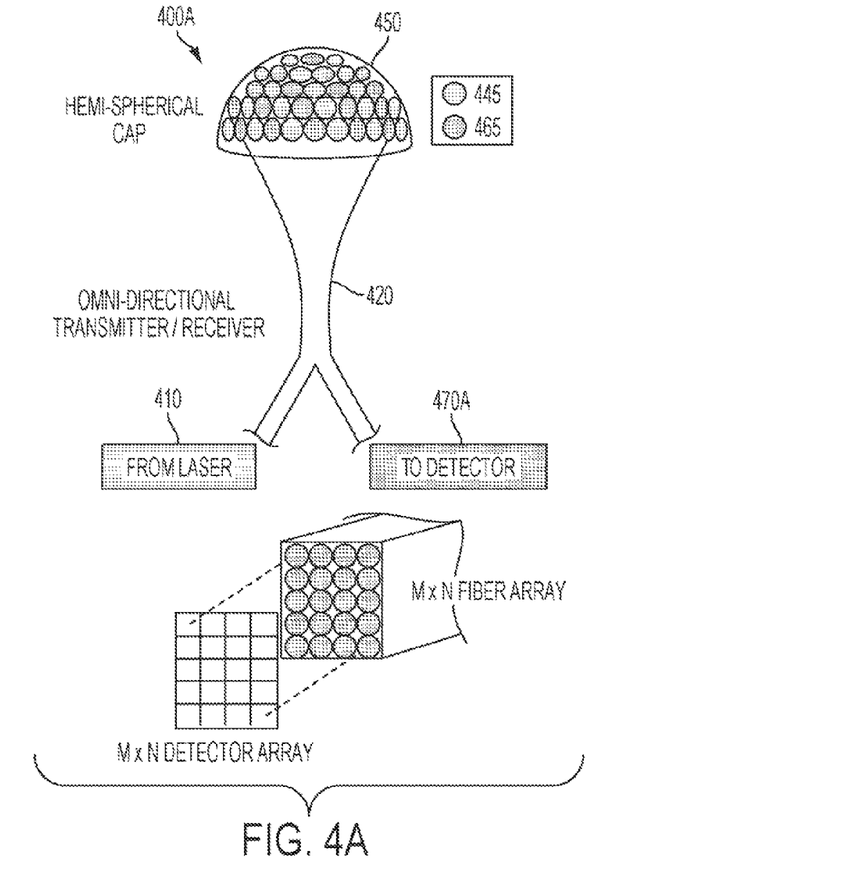
FIGS. 4A and 4B illustrate exemplary receiver optics for use in a multi-directional sensing system in accordance with various embodiments.
Figure 4B:
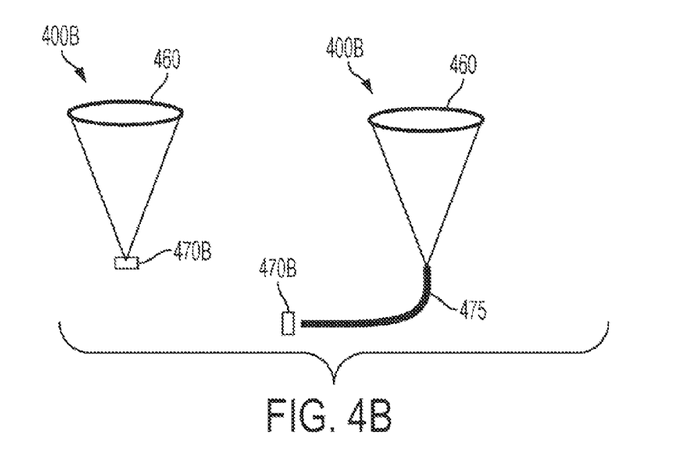

FIGS. 4A and 4B illustrate exemplary receiver optics 400 for use in multi-directional sensing system 100 in accordance with embodiments.

FIG. 4A shows multi-directional transmitter/receiver 400A having integrated transmitter optics and receiver optical fibers in accordance with an embodiment. Multi-directional transmitter and receiver 400A includes cap 450 which a plurality of transmitter optical fibers 445 terminate and receiver optical fibers 465 originate. As shown, cap 450 has a hemispherical shape. Of course, cap 450 may have other three-dimensional shapes, such as, for an example, a sphere, ellipsoid, cube, prism, pyramid, etc, as desired.

Transmitter optical fibers 445 directs light from laser 410 to cap 450 and emit outwardly away from cap 450. Electromagnetic radiation (light) generated by laser 410 is transmitted via one or more transmitter optical fibers 445 to cap 450 and emitted. Each of the plurality of transmitter optical fibers 445 terminates in a different direction on the surface of cap 450 to emit electromagnetic radiation.

In addition, one or more of the receiver optical fibers 465 receive electromagnetic radiation (light) at surface of cap 450 and direct the light to detector 470A. For instance, one end of each of the receiver optical fibers 465 originates on the surface of the cap 450 in a different direction on the surface of cap 450 to receive electromagnetic radiation. In one embodiment (shown), at the surface of cap 450, transmitter optical fibers 445 may be interspersed with receiver optical fibers 465. Of course, the layout of transmitter fibers 445 and receiver optical fibers 465 at the surface of cap 450 may be different in other implementations. The other end of each of the receiver optical fibers 465 terminates at the detector 470A.

In some instance, receiver optical fibers 465 may be arranged in a M×N array corresponding to an M×N detector array.

FIG. 4B shows uni-directional (single directional) receiver optics 400B in accordance with an embodiment. Uni-directional receiver optics 400B may be separate from a multi-directional transmitter (such as, for example, transmitter 300).

Light from a target and/or scene is passed through optics 460 and is collimated toward detector 470B. Optics 460 may include, for example, one or more lenses (one shown), directed mirror, filters, etc. A single wide field of view (WFOV) receiver (shown) or multiple narrower FOV receivers, for instance, may be used, that feed one or more detector elements.

In an alternative implementation, uni-directional receiver 400B' may include optics 460 which focuses light toward one or more fibers 475 that direct the light to one or more detectors 470B. Each receiver fiber 475 may direct light to a single detector element of a detector array.

Figure 5:
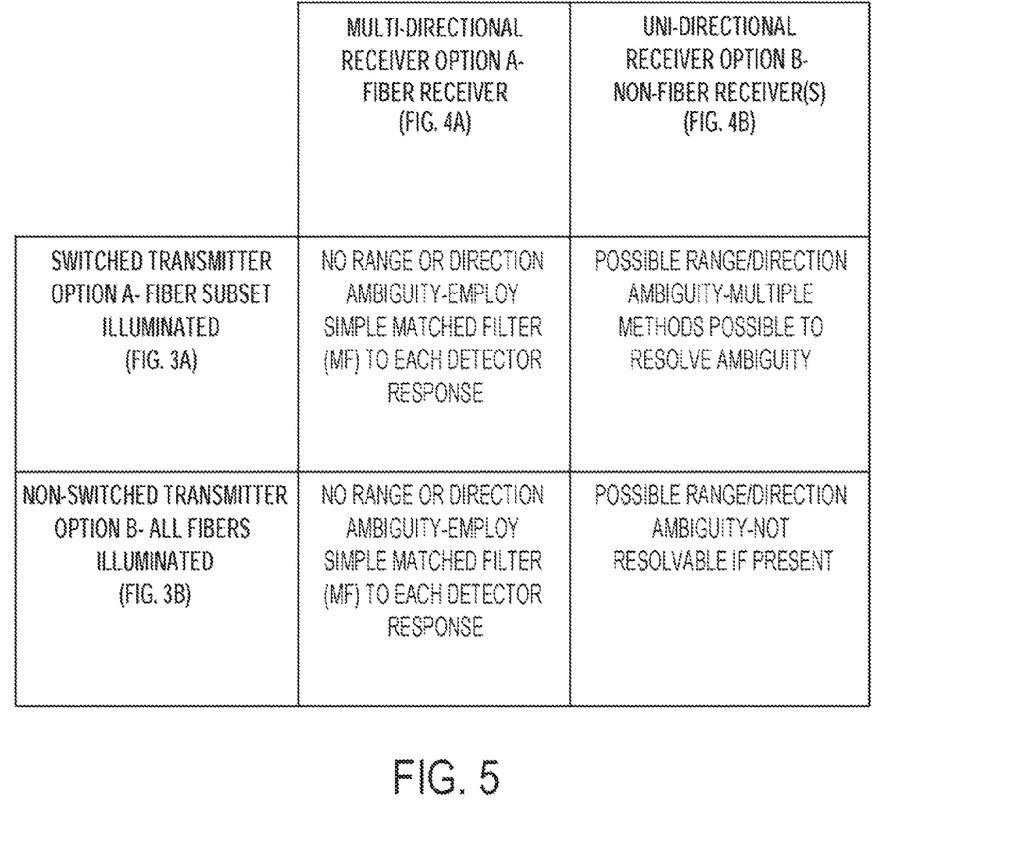
FIG. 5 is a chart comparing various transmitter and receiver optics combinations for use with a multi-directional sensing system in accordance with various embodiments.

FIG. 5 is a chart comparing various transmitter and receiver optics combinations for use with multi-directional sensing system 100 in accordance with embodiments. The particular transmitter/receiver optics combination used in system 100 may dictate range and direction ambiguities as explained below.

For example, for both the switched transmitter 300A/ multi-directional receiver 400A and the non-switched transmitter 300B/multi-directional receiver 400A combinations, there may be no range or direction ambiguity. The detector may include a simple matched filter (MF), in some instances, to improve detector response for each received beam.

For the switched transmitter 300A/uni-directional receiver 400B combination, there may be a possible range or direction ambiguity. This ambiguity may be resolved by multiple methods, such as, for instance, described below with respect to FIGS. 7A and 7B. On the other hand, for the non-switched transmitter 300B/uni-directional receiver 400A combination, there is also a possible range and direction ambiguity. Unfortunately, this ambiguity may not be easily resolvable by the same methodologies, if present.

Figure 6:
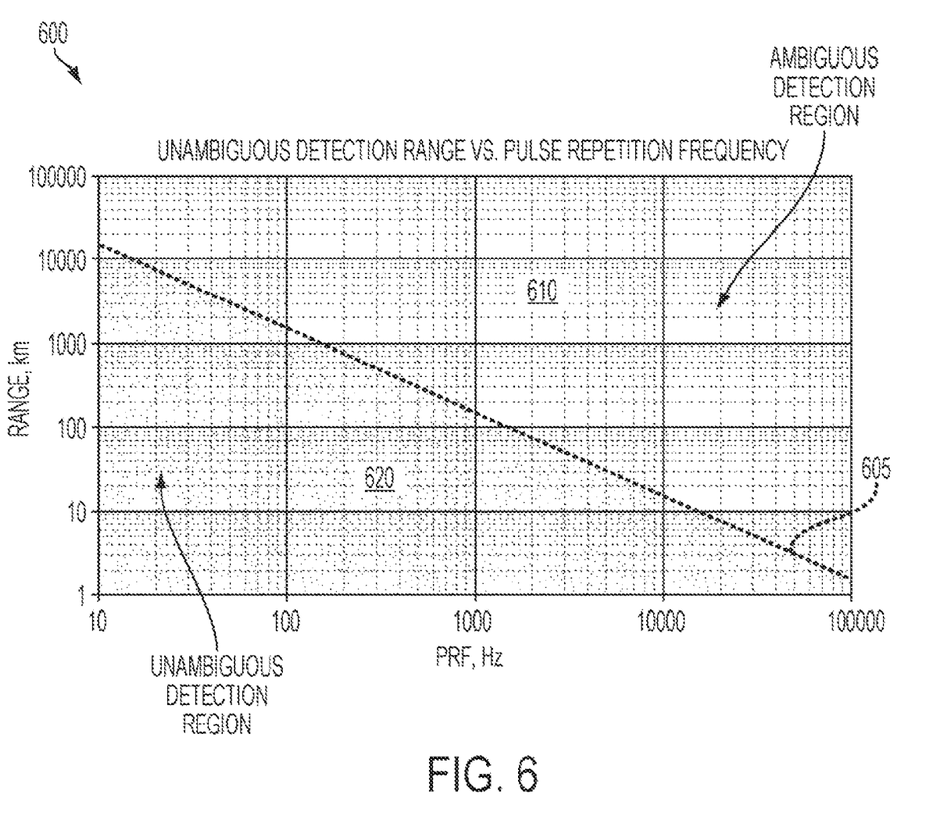
FIG. 6 illustrates a plot showing detection ambiguity for various pulsed repetition frequency (PRF) and ranges.

FIG. 6 illustrates plot 600 showing detection ambiguity for various pulse repetition frequencies (PRF) and ranges.

When transmitting and receiving multiple beams, a problem can arise in knowing which received beam corresponds to which transmitted beam. This may occur because not all transmitted beams may be received by the sensor system, such as, for example, when light is reflected in directions away from the receiver optics. In other cases, light may be slowed down in the scene (e.g. due to change of medium or longer return distance) such that some beams return to the receiver late and/or may not in be received in the transmitted sequence. Lastly, if the target is far enough away, and/or the PRF is sufficiently high, then multiple beams may be transmitted in multiple directions before a return beam is received. As such, pulse range and direction ambiguities may be problematic.

Assuming that a beam travels the speed of light, c (roughly 3×10$^5$ km/s), it should be able to travel a distance to a target (i.e., range) and back in a certain time period. This speed/distance relationship is related to the PRF of the laser (or other pulsed light source).

Line 605 signifies the estimated range that a transmitted beam along the shortest "line-of-sight" path that a beam of light is expected to travel to a target and back (i.e., 2×Range) at the speed of light c for any given PRF value. Line 605 in plot 600 is defined according to equation (2) as follows:

$$\text{Range} = \frac{c}{2 \cdot PRF} \quad (2)$$

Region 610 located above line 605 indicates an "unambiguous" detection region. This region corresponds to situations in which the actual range is less than the estimated range for a PRF value. Thus, when detected, there is a very high likelihood (if not certainty) that a received beam corresponds to the one just transmitted from the sensing system.

On the other hand, region 620 located below line 605 indicates an "ambiguous" detection region. This region corresponds to situations in which the actual range is greater than the estimated range for a PRF value. Unfortunately, for a beam corresponding to the range and PRF values in region 620, it cannot be readily determined that a received beam corresponds to the one just transmitted.

It may be desirable to eliminate range and direction ambiguities, although it should be noted that many sensors and detectors may become energy or power limited before range ambiguities arise.

Figure 7A:
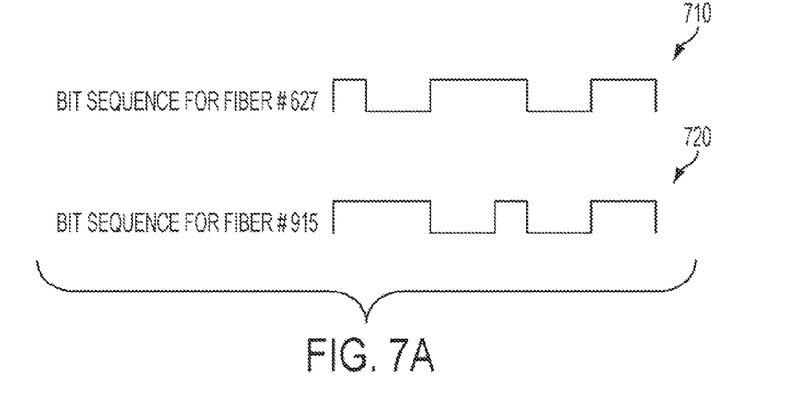
FIGS. 7A and 7B illustrate pulse encoding and transmission sequencing technique which may be used to eliminate range and direction ambiguities using the multi-directional sensing system in accordance with various embodiments.
Figure 7B:
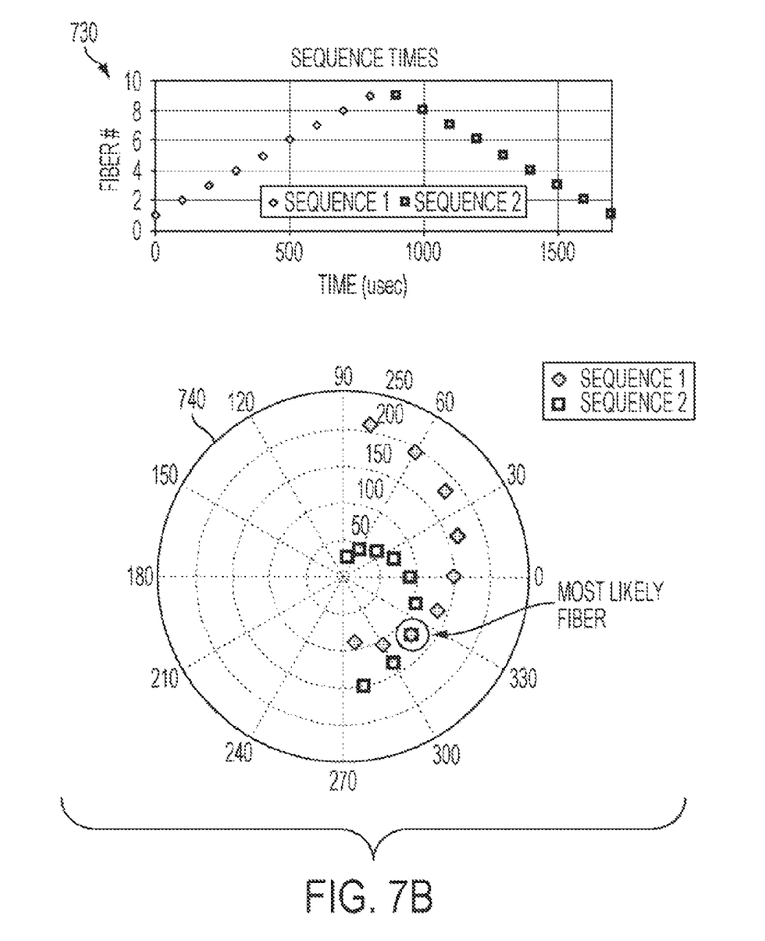

FIGS. 7A and 7B illustrate pulse encoding and transmission sequencing technique which may be used to reduce or eliminate range and direction ambiguities using multiple direction sensing system 100 in accordance with embodiments.

One way to overcome range and direction ambiguities is to encode each transmitted beam with a unique identifying code. For example, in some implementations, a unique bit sequence may be assigned to each beam and/or for each fiber of the transmitter. Thus, regardless of when a beam is received (or not received), the identity of its corresponding transmitted beam and/or fiber transmitted from, can readily be determined by decoding the received beam. This technique may be advantageous for reflected beams of light.

FIG. 7A illustrates an exemplary method for pulse encoding beams to eliminate range and direction ambiguities in accordance with an embodiment.

The bit sequence used to encode beams may be a binary pulsed code, as shown. Although, it should be appreciated that other techniques might also be used, such as, amplitude modulation (AM), frequency modulation (FM), or the like.

For binary pulse coding, a beam pulse may be dividing into equal sub-periods, and the light source may be selectively controlled so as that a generated beam may be selectively pulsed ON (value=1) and OFF (value=0) for sub-periods of the beam pulse to implement the code.

Assuming there are N transmitter fibers, a bit sequencing scheme requires $\log_2(N)$ bits per pulse to provide a unique identity for each fiber. Two exemplary pulse encoded beams are depicted in FIG. 7A. Beam 710 corresponds to a bit sequence value of 627. And, beam 720 corresponds to a bit sequence value of 915. Other beams may be selectively encoded in a similar manner. When beams are detected, the encoded bit sequence of the beam can be decoded by the processor to determine and match it to a specific beam and/or transmitter fiber.

FIG. 7B illustrates an exemplary method for transmission sequencing to eliminate range and direction ambiguities. The method uses multiple fiber optic transmission sequences, which are detected, and their detected coincidence may be analyzed to provide insight as to a likely target locations using time-of-flight and fiber direction. In one implementation, the method uses combined transmitter and receiver 400 (FIG. 4A).

Plot 730 illustrates a sequence of beams transmitted from various optical fibers. The optical fibers may be pulsed, at regular intervals, in two distinct but opposite sequences. For instance, the fibers numbers 1 to 10 are pulsed, at regular intervals, in a first ascending sequence (Sequence 1) followed by a second descending pulse sequence (Sequence 2). Each of the pulsed transmitted beams may be transmitted in a different direction or orientation based on the location or orientation of its fiber with respect to the transmitter cap. The target location, however, may be unknown, due to beam interactions with the target and/or scene. Other beam sequences might also be used.

Plot 740 illustrates a polar plot of possible target locations (angular and radial distances) based on the received electromagnetic radiation (light) and corresponding to transmission Sequence 1 and Sequence 2. For each sequence, a single beam may be received and multiple target positions can be hypothesized based on the transmission sequence. Based on single sequence it may be impossible to determine the true target location, but multiple different transmission sequences allow the range/direction ambiguity to be resolved.

As shown, both sequences produce a "spiral" pattern—although other patterns may be produced using other transmission sequences and other instances. The target and/or scene will likely dictate the received energy pattern. The two sequences of transmitted light intersect or coincide at a single point (as circled in the figure). This point corresponds to the most likely target location.

Further temporal processing may be used to help detect moving targets. For example, the target location over time may be tracked. Predictions of the target's position and velocity in the future may be generated based on historic position and velocity measurements. This information may be used to augment and help resolve target direction and range ambiguities and suppress false alarms.

In some implementations, one or both of pulse encoding and transmission sequencing may be used together to improve detection. For instance, both methodologies may be used simultaneously. Of course, it will be appreciated that other methods to eliminate range and direction ambiguities might also be used.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A multi-directional sensor system, comprising:
    a light source configured to generate a beam of electromagnetic radiation;
    a transmitter configured to transmit the beam of electromagnetic radiation to a target, said transmitter comprising:
        (i) a plurality of optical fibers, wherein one or more of the optical fibers are configured to receive the beam of electromagnetic radiation, and
        (ii) a surface on which one end of each of the plurality of optical fibers terminate in a different direction and/or orientation thereof to emit electromagnetic radiation;
    a detector configured to detect electromagnetic radiation responsive to electromagnetic radiation transmitted to the target; and
    a processor configured to:
        (i) control the light source, or (ii) process the output from the detector, or both,
        (iii) cause the light source to emit the electromagnetic radiation beam with an encoded pulse, wherein each beam or fiber optic of the transmitter has a different encoded pulse sequence, wherein the encoding comprises a plurality of unique bit sequences; and
        (iv) determine, from received encoded pulses detected in a received beam, a corresponding transmitted beam or fiber optic of the transmitter,
    wherein each transmitter fiber is associated with a unique bit sequence.

2. The system according to claim 1, further comprising:
    beam shaping optics configured to optically shape the beam of electromagnetic radiation from the light source.

3. The system according to claim 1, further comprising a switching element configured to select one of the optical fibers for receiving the beam of electromagnetic radiation.

4. The system according to claim 1, wherein the surface of the transmitter is substantially spherical or hemispherical shaped.

5. The system according to claim 1, further comprising:
    a receiver configured to receive electromagnetic radiation responsive to electromagnetic radiation transmitted to the target and direct the received electromagnetic radiation to the detector.

6. The system according to claim 5, wherein the receiver includes one or more optical fibers.

7. The system according to claim 6, wherein one or more of the optical fibers of the receiver are integrated in a fiber optic bundle in the transmitter.

8. The system according to claim 7, wherein one end of each of the plurality of optical fibers of the receiver is arranged on the surface of the transmitter in a different direction and/or orientation on the surface of the transmitter to receive electromagnetic radiation.

9. The system according to claim 8, wherein the opposing end of each of the plurality of optical fibers of the receiver terminates at the detector.

10. The system according to claim 5, wherein the receiver comprises a lens.

11. The system according to claim 1, wherein the light source is a laser.

12. The system of claim 1, wherein the detector is further configured to detect one or more of refracted, diffracted, interference, and secondary electromagnetic radiation received from the target.

13. A multi-directional sensor system, comprising:
    a light source configured to generate a beam of electromagnetic radiation;
    a transmitter configured to transmit the beam of electromagnetic radiation to a target, said transmitter comprising:
        (i) a plurality of optical fibers, wherein one or more of the optical fibers are configured to receive the beam of electromagnetic radiation, and (ii) a surface on which one end of each of the plurality of optical fibers terminate in a different direction and/or orientation thereof to emit electromagnetic radiation;
a detector configured to detect electromagnetic radiation responsive to electromagnetic radiation transmitted to the target; and
a processor configured to:
(i) control the light source, or (ii) process the output from the detector, or both,
(iii) select a plurality of, optical fibers to transmit electromagnetic radiation in a selected sequence of the optical fibers; and
(iv) determine, from the detected electromagnetic radiation, a target location corresponding to received electromagnetic radiation
(v) cause the light source to emit the electromagnetic radiation beam with an encoded pulse, wherein each beam or fiber optic of the transmitter has a different encoded pulse sequence; and
(vi) determine, from received encoded pulses detected in a received beam, a corresponding transmitted beam or optical fiber of the transmitter.

14. The system according to claim 13, whether the sequence comprises:
a first sequence of beams transmitted from a plurality of fibers; and
a second sequence of beams transmitted from the same plurality of fibers in an opposite order.

15. The system of claim 13, further comprising:
beam shaping optics configured to optically shape the beam of electromagnetic radiation from the light source.

16. The system of claim 13, further comprising a switching element configured to select one of the optical fibers for receiving the beam of electromagnetic radiation.

17. The system of claim 13, wherein the surface of the transmitter is substantially spherical or hemispherical shaped.

18. The system of claim 13, further comprising:
a receiver configured to receive electromagnetic radiation responsive to electromagnetic radiation transmitted to the target and direct the received electromagnetic radiation to the detector.

19. The system according to claim 18, wherein the receiver includes one or more optical fibers.

20. The system according to claim 19, wherein one or more of the optical fibers of the receiver are integrated in a fiber optic bundle in the transmitter.

21. The system according to claim 20, wherein one end of each of the plurality of optical fibers of the receiver is arranged on the surface of the transmitter in a different direction and/or orientation on the surface of the transmitter to receive electromagnetic radiation.

22. The system according to claim 21, wherein the opposing end of each of the plurality of optical fibers of the receiver terminates at the detector.

23. The system according to claim 18, wherein the receiver comprises a lens.

24. The system of claim 13, wherein the detector is further configured to detect one or more of refracted, diffracted, interference, and secondary electromagnetic radiation received from the target.

25. A method for sensing electromagnetic radiation, comprising:
generating a beam of electromagnetic energy with a light source;
transmitting the beam of electromagnetic energy to a target by:
(i) receiving, via one or more optical fibers, the beam of electromagnetic radiation from the light source; and
(ii) transmitting electromagnetic energy from a surface which one end of each of the plurality of optical fibers terminate in a different direction and/or orientations thereof to emit electromagnetic radiation so as to achieve a desired angular coverage; and
at least detecting electromagnetic radiation responsive to electromagnetic radiation transmitted to reflected from the target;
controlling the light source, processing the output from the detector, or both;
causing the light source to emit the electromagnetic radiation beam having an encoded pulse, each beam or fiber optic of the transmitter having a different encoded sequence; and
determining, from a detected encoded pulse received in a received beam, a corresponding transmitted beam or fiber optic of the transmitter,
wherein the encoding comprises using bit sequences, and
wherein each transmitter fiber is associated with a unique bit sequence.

26. The method of claim 25, further comprising:
selecting one of the optical fibers of the transmitter for receiving the beam of electromagnetic radiation.

27. The method of claim 25, wherein said at least detecting electromagnetic radiation reflected from the target further comprises detecting one or more of refracted, diffracted, interference, and secondary electromagnetic radiation received from the target.

28. A method for sensing electromagnetic radiation, comprising:
generating a beam of electromagnetic energy with a light source;
transmitting the beam of electromagnetic energy to a target by:
(i) receiving, via one or more optical fibers, the beam of electromagnetic radiation from the light source; and
(ii) transmitting electromagnetic energy from a surface which one end of each of the plurality of optical fibers terminate in a different direction and/or orientations thereof to emit electromagnetic radiation; and
detecting electromagnetic radiation responsive to electromagnetic radiation transmitted to the target;
selecting a plurality of, and sequences thereof to transmit electromagnetic radiation; and
determining, from received electromagnetic radiation, a target location corresponding to received electromagnetic magnetic radiation.

29. The method of claim 28, wherein said at least detecting electromagnetic radiation reflected from the target further comprises detecting one or more of refracted, diffracted, interference, and secondary electromagnetic radiation received from the target.

30. The method according to claim 28, further comprising:
selecting one of the optical fibers of the transmitter for receiving the beam of electromagnetic radiation.

* * * * *